United States Patent [19]

Maki

[11] Patent Number: 5,777,317

[45] Date of Patent: Jul. 7, 1998

[54] BOOSTING CIRCUIT AND SOLID-STATE IMAGE-SENSING DEVICE EMPLOYING SAID BOOSTING CIRCUIT

[75] Inventor: Yasuhito Maki, Kanagawa, Japan

[73] Assignee: Sony Corporation, Tokyo, Japan

[21] Appl. No.: 827,778

[22] Filed: Apr. 11, 1997

Related U.S. Application Data

[63] Continuation of Ser. No. 452,577, May 25, 1995, abandoned.

[30] Foreign Application Priority Data

May 27, 1994  [JP]  Japan ................... 6-138150

[51] Int. Cl.⁶ ............................................. H01J 40/14
[52] U.S. Cl. ............................ 250/208.1; 250/214 R; 327/390
[58] Field of Search ................... 250/208.1, 214.1, 250/214 R; 327/536–537, 533–535, 541, 589, 390; 377/58–62; 257/223, 233, 229–234

[56] References Cited

U.S. PATENT DOCUMENTS

| | | | |
|---|---|---|---|
| 4,311,923 | 1/1982 | Lüscher et al. | 327/541 |
| 5,059,815 | 10/1991 | Bill et al. | 327/536 |
| 5,081,371 | 1/1992 | Wong | 327/536 |
| 5,311,319 | 5/1994 | Monoi | 348/300 |
| 5,469,848 | 11/1995 | Sato et al. | 327/536 |

FOREIGN PATENT DOCUMENTS

A2 409245  1/1991  European Pat. Off.

*Primary Examiner*—Que Le
*Attorney, Agent, or Firm*—William S. Frommer; Alvin Sinderbrand

[57] ABSTRACT

A boosting circuit comprises a power supply terminal, an output terminal a one-way element and a one-way element for charging. The one-way element comprises a plurality of stages connected in series across the power supply terminal and the output terminal in a forward direction going from the power supply terminal to the output terminal, with clock pulses being applied between each of the one-way element stages. The one-way element for charging is connected in parallel with the one-way element in the forward direction. It is therefore possible to provide a boosting circuit with an improved boosting voltage rise characteristic without having to change the size of the circuit elements.

20 Claims, 6 Drawing Sheets

BOOSTING CIRCUIT AND SOLID-STATE IMAGE-SENSING DEVICE EMPLOYING SAID BOOSTING CIRCUIT

This application is a continuation of application Ser. No. 08/452,577, filed May 25, 1995 now abandoned.

BACKGROUND OF THE INVENTION

1. Field of the Invention

The present invention relates to a boosting circuit and a solid-state image-sensing device employing this boosting circuit, and more particularly to a pulse-boosting type boosting circuit a solid-state image-sensing device employing this pulse-boosting type boosting circuit.

2. Description of Related Art

Figure 10:
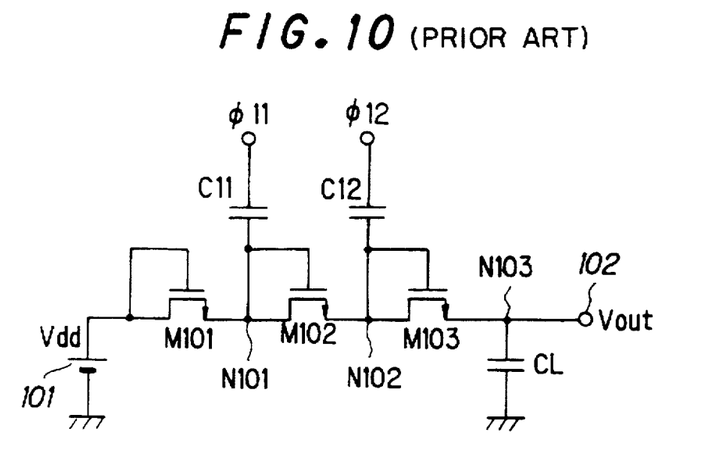
FIG. 10 is a circuit diagram showing a related art example.

FIG. 10 is a view showing an example of a pulse-boosting type boosting circuit of the related art. In FIG. 10, so-called diode connection N-channel type MOSFET's (hereinafter referred to simply as MOS transistors) M10n with their gates and drains connected in common are connected in series in, for example, three stages across the positive pole of a power supply 101 and a circuit output terminal 102.

A clock pulse $\phi 11$ is then applied to an output end N101 of the first stage MOS transistor M101 via the capacitor C11 and a clock pulse $\phi 12$ of a phase which is opposite to that of the clock pulse $\phi 11$ is applied to the output end N102 of the second stage MOS transistor M102.

A load capacitor CL is connected across the output end N103 (circuit output terminal 12) of the third stage MOS transistor M103 and ground.

The boosting circuit of the above construction is used as a Vsub generation boosting circuit which boosts the power supply voltage in image-sensing devices known as linear sensors (line sensors) or area sensors and takes this boosted voltage Vout as a substrate voltage Vsub.

With these solid-state image-sensing devices, there is a tendency for a power supply voltage which is starts at 5V to fall to 3V or less. A substrate voltage Vsub of about 5V is necessary, however, to ensure that the performance of the image-sensing device can be drawn-out even if the power supply voltage becomes low. Therefore, as the power supply voltage becomes lower, a Vsub generation boosting circuit becomes necessary for boosting the power supply voltage and generating the substrate voltage Vsub.

Figure 11:
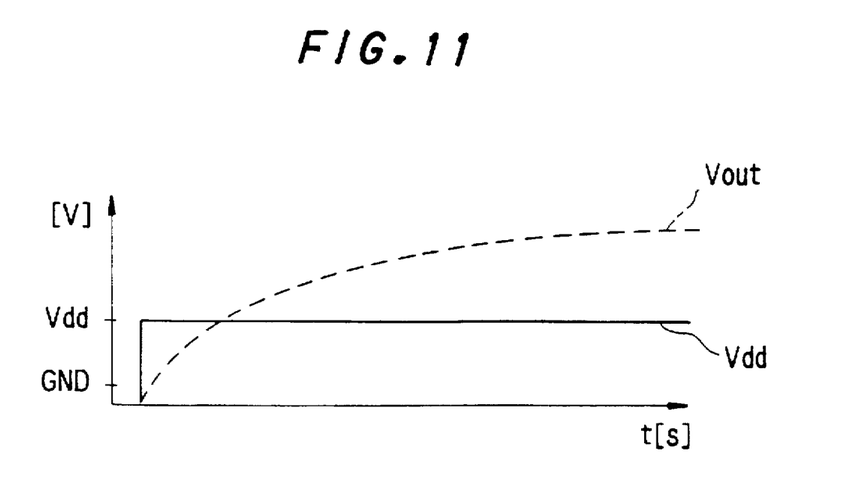
FIG. 11 is a wave diagram showing the response waveform when the power supply is turned in the related art example.

When used as a Vsub generation boosting circuit for a solid-state image-sensing apparatus, the whole of the solid-state image-sensing device substrate (chip) becomes a load capacitance and large capacitance driving and a current capacitances become necessary. This causes the rising characteristic of the boosting voltage Vout to be poor, as shown in FIG. 11.

The problem of the rise time being slow is not just limited to use in Vsub generation boosting circuits but is common to applications in which large capacitor drivers and current capacitors become necessary overall.

With the boosting circuit having the above structure, the current Ids across the drain and source of each of the MOS transistors M101 to M103 may be made large so as to make the rise time for the boosting voltage Vout shorter. In order to achieve this it is necessary to lower the threshold voltage Vth of each of the MOS transistors M101 to M103, make the channel width larger, or make the channel length L shorter.

In reality, it is usual to make the channel width W large. However, in this case the value of the capacitors C11 and C12 etc. have to be made large so that the potential of the boosting voltage Vout does not fall as a result of the increase in the capacitance between the gates and sources (gates and drains) of each of the transistors M101 to M103.

In doing so, when this boosting circuit is used, for example, as a Vsub generation boosting circuit of a solid-state image-sensing apparatus, a large amount of space is required on the substrate of the solid-state image-sensing circuit in order to make (on-chip) this boosting circuit, which impedes the miniaturization of the solid-state image-sensing apparatus.

SUMMARY OF THE INVENTION

In order to resolve the aforementioned problems, it is the object of the present invention to provide a boosting circuit and a solid-state image-sensing device using this boosting circuit which have improved boosting voltage rise characteristics without it being necessary to change the size of the circuit elements.

In order to achieve this object, a boosting circuit comprises a power supply terminal, an output terminal a one-way element and a one-way element for charging. The one-way element comprises a plurality of stages connected in series across the power supply terminal and the output terminal in a forward direction going from the power supply terminal to the output terminal, with clock pulses being applied between each of the one-way element stages. The one-way element for charging is connected in parallel with the one-way element in the forward direction.

The one-way element for charging may be a MOS transistor or a diode and a load capacitor may be connected across the output terminal of the final stage of the one-way element and earth. The clock pulses are first and second clock pulses of opposite phases.

Further, a solid-state image-sensing device comprises a sensor, a charge transfer register, a charge detector, a power supply terminal, an output terminal and a boosting circuit. The sensor has a plurality of arrayed light receivers for converting incident light into charges corresponding to the amount of incident light and accumulating the charges. The charge transfer register is for transferring charges read-out from each of the light receivers. The charge detector is for detecting and converting to electrical signals charges transferred by the charge transfer register. The boosting circuit comprises a one-way element comprised of a plurality of stages connected in series across the power supply terminal and the output terminal in a forward direction going from the power supply terminal to the output terminal, with clock pulses being applied between each of the one-way element stages and a one-way element for charging connected in parallel with the one-way element in the forward direction.

Preferably, the boosting circuit boosts a power supply voltage and generates a substrate voltage. Also, the sensor, charge transfer register, charge detector and boosting circuit are formed on the same substrate.

The one-way element for charging may be a MOS transistor or a diode and a load capacitor may be connected across the output terminal of the final stage of the one-way element and earth.

A load capacitor may be connected across the clock pulse input terminal and the one-way element output terminal.

The clock pulses are first and second clock pulses of opposite phases. The clock pulse may also be a transfer clock for driving the charge transfer register.

With the circuit of the above construction, when the power supply is turned on, first, a load is charged via the one way element due to this one-way element for charging connected in the forward direction from the power supply side to the circuit output terminal side going into a forward biased state so as to conduct.

Further, the plurality of stages of the one-way element for boosting also go into forward bias so as to conduct due to the power supply going on, so that the charging operation which accompanies the boosting operation of the plurality of stages of the one-way element is also carried out in parallel and the load charging voltage therefore rapidly rises up to the power supply voltage.

When the load charging voltage exceeds the power supply voltage, the one-way element for charging which has been carrying out charging up until this point goes into reverse bias so as to be in an non-conducting state.

Charging due to the one-way element is therefore not carried out after this and a boosting operation is performed by the plurality of stages of the one-way element for boosting in synchronization with a reverse phase clock pulse.

DETAILED DESCRIPTION OF THE PREFERRED EMBODIMENTS

First Embodiment

The following is a detailed description, based on the drawings, of the embodiments of the present invention.

Figure 1:
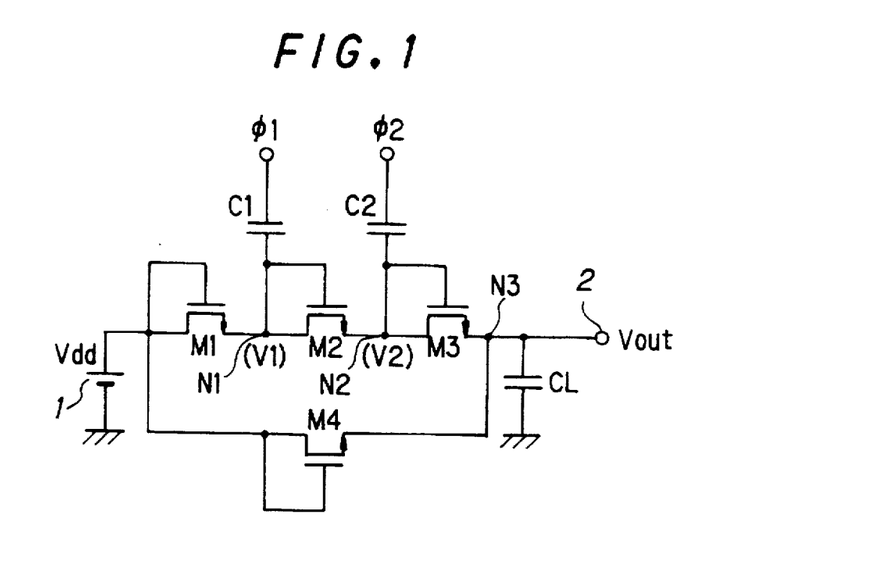
FIG. 1 is a circuit diagram showing a first embodiment of the present invention.

FIG. 1 is a circuit diagram showing a first embodiment of a booster circuit according to the present invention. In FIG. 1, for example, three stages of MOS transistors Mn for boosting having their gates and drains connected in common are connected in series in the forward direction from the side of the power supply 1 to the circuit output element 2 as a one-way element across the positive pole side of the power supply 1 and the circuit output element 2.

A clock pulse $\phi 1$ is applied to the output end N1 of the first stage MOS transistor M1 via a capacitor C1. On the other hand, a clock pulse $\phi 2$ having a phase which is the opposite of that of the clock pulse $\phi 1$ is applied to the output end N2 of the second MOS transistor M2.

A load capacitor CL is connected between the output N3 (circuit output terminal 2) of the third stage MOS transistor M3.

A MOS transistor M4 for charging is connected across the positive pole side of the power supply 1 and the circuit output terminal 2 in a forward direction going from the side of the power supply 1 to the side of the circuit output terminal 2. i.e. the gate and drain of the MOS transistor for charging are wired to the positive pole side of the power supply 1 and the source is wired to the circuit output terminal 2.

This MOS transistor M4 for charging is provided for promptly charging the load capacitor CL at the time of power supply start-up and the drain-source current Ids is set to be large.

Specifically, the drain-source current Ids of the MOS transistor M4 is set to be large by lowering the threshold voltage Vth of the MOS transistor M4, making the channel width W large, or shortening the channel length L.

Next, a description is given of the booster operation for the booster circuit of the first embodiment having the above construction.

First, the power supply goes on (power supply on), the MOS transistor M4 for charging conducts so as to become forward-biased and the charging of the load capacitor CL via the MOS transistor M4 for charging therefore commences. Further, by turning on the power supply 1, the MOS transistors M1 to M3 for boosting also become forward biased and conduct (go on) so that the charging which accompanies the boosting operation of the transistors M1 to M3 for boosting can be carried out simultaneously.

Figure 2:
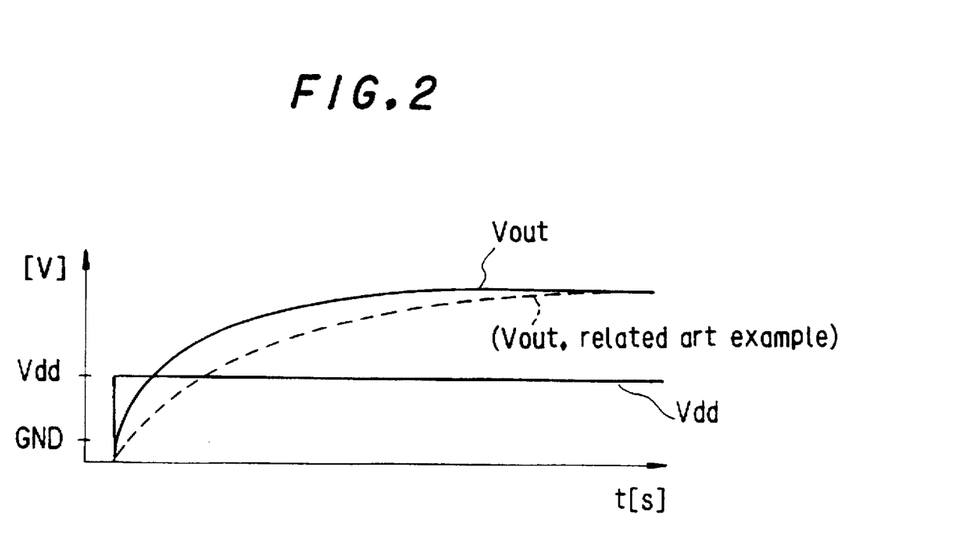
FIG. 2 is a wave diagram showing the response waveform when the power supply is turned on for the first embodiment.

In this way, the booster voltage Vout can be made to rise quickly, as shown by the solid line in FIG. 2, because the load capacitor CL can be rapidly charged via the MOS transistor M4 for charging at the time of turning on. The dashed line in FIG. 2 shows the response waveform at the time of turning on for a related art example.

The charging of the load capacitor continues, and when the charging voltage exceeds the power supply voltage Vdd, the MOS charging transistor M4 goes into reverse bias state, so that the conducting state is cut off.

After this, the ordinary boosting operation using the MOS boosting transistors M1 to M3 is carried out. This ordinary boosting operation is described with reference to the timing chart in FIG. 3.

Figure 3:
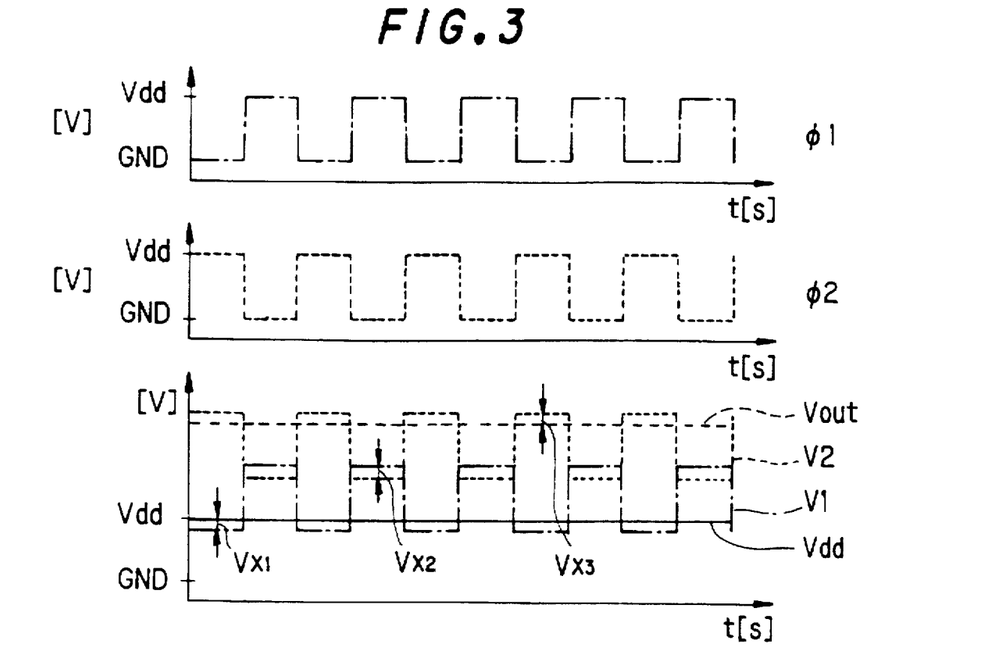
FIG. 3 is a timing diagram under fixed conditions for the first embodiment.

First, when the clock pulse $\phi 1$ is of a low level (i.e. low), the gate and drain of the MOS transistor M1 are connected to the positive pole side of the power supply 1. The voltage V1 of this output end N1 is therefore lower than the power supply voltage Vdd by an amount Vx1. This Vx1 is the voltage drop portion due to the threshold voltage Vth1 of the MOS transistor M1.

Under these conditions, if the clock pulse $\phi 1$ is inputted via the capacitor C1, the voltage V1 at the output end N1 of the MOS transistor M1 is boosted only by the peak value portion of the clock pulse $\phi 1$.

On the other hand, the clock pulse $\phi 2$ is of an opposite phase to that of the clock pulse $\phi 1$. Therefore, when the level of the clock pulse $\phi 2$ is low, the voltage V2 at the output end N2 of the MOS transistor M2 becomes lower than the voltage V1 of the output end N1 by just Vx2. The voltage Vx2 is the voltage drop portion due to the threshold voltage Vth2 of the MOS transistor M2.

Under these conditions, if the clock pulse $\phi 2$ is inputted via the capacitor C2, the voltage V2 at the output end N2 of the MOS transistor M2 is boosted only by the peak value portion of the clock pulse φ2.

The voltage V2 at the output end N2 is smoothed by the MOS transistor M3 and the load capacitor CL and derived from the circuit output terminal 2 as the boosting voltage Vout. The boosting voltage Vout is lower than the voltage V2 of the output end N2 by an amount Vx3. Here, $Vx_3$ is the lowering of the voltage due to the threshold voltage $Vth_3$ of the MOS transistor M3.

As described above, by providing the MOS charging transistor M4 of which the gate and drain are connected to the positive pole side of the power supply 1 and source is connected to the circuit output terminal 2 in a pulse boosting-type boosting circuit, when the power supply is turned on, the boosting voltage Vout can be made to rise rapidly because the load capacitor CL is rapidly charged via the MOS charging transistor M4.

Also, a boosting circuit for which the boosting voltage Vout rises rapidly when the power supply is turned on can be provided without making the size of the MOS boosting transistors M1 to M3 and the capacitance values of the capacitors C1 and C2 large by setting the drain-source current Ids of the MOS charging transistor M4 to be large. The space that goes with having small-sized transistors and small-capacitance capacitors can be saved within the circuit structure.

Figure 4:
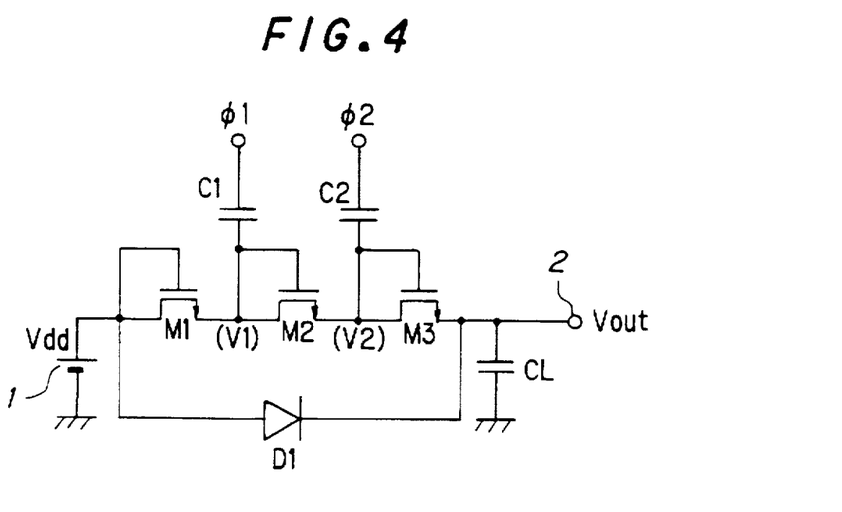
FIG. 4 is a circuit diagram showing an example modification of the first embodiment.

In the aforementioned embodiment, a description has been given for the case where a diode connection MOS transistor M4 has been used as the one-way element. However, as shown in FIG. 4, a diode D1, the anode of which is connected to the positive pole side of the power supply 1 and the cathode of which is connected to the circuit output terminal 2, may also be used.

But, with boosting circuits using MOS transistors as the one-way boosting element, using the diode connection MOS transistor M4 has advantages with regards to making the circuit, as shown in the first embodiment. However, variations occur more often with MOS transistors than with diodes. The use of a diode D1 as the one way boosting element therefore provides a characteristic with fewer variations, as shown in the example shown in FIG. 4.

Figure 5:
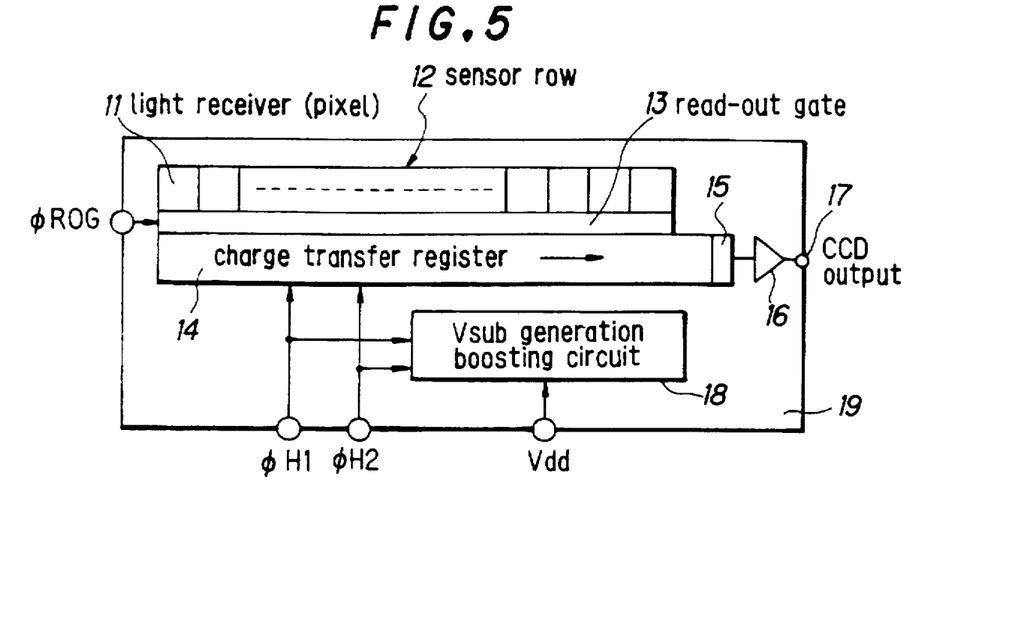
FIG. 5 is a view showing the structure of an example of a CCD linear sensor of the present invention.

FIG. 5 is a structural view showing an example of a solid-state image-sensing device employing a boosting circuit of the aforementioned construction as a Vsub generator boosting circuit. An application in a CCD linear sensor is shown as the solid-state image-sensing apparatus in this example, but applications are by no means limited to CCD linear applications and applications in solid-state image-sensing apparatus including area sensors other than CCDs are also possible.

As shown in FIG. 5, the CCD linear sensor comprises a sensor row 12 consisting of a plurality of light receivers 11 made up from photodiodes etc. which convert and accumulate incident light into a charge corresponding to the amount of light and a charge transmitting register 14 made up of a CCD for transmitting signal charges outputted from each of the light receivers 11 of the sensor row 12 via a read-out gate 13.

The read-out gate 13 immediately reads out to the charge transfer register 14 the signal charges accumulated at each of the light receivers 11 of the sensor row 12 using the application of the read-out pulse φROG. The signal charge is transferred using two-phase driving employing two-phase transmission clocks φH1 and φH2. A charge voltage converter (charge detector) 15, of, for example, a floating diffusion structure for detecting the transmitted signal charge and converting it to a voltage is formed at the final stage of the charge transfer register 14. The output voltage for this charge voltage converter 15 is outputted from the output terminal 17 via the buffer 16 as the CCD output.

With the CCD linear sensor of the aforementioned structure, the boosting circuit of the present invention is used as a Vsub generator booster circuit 18 for boosting the power supply voltage Vdd and generating a substrate voltage Vsub. This Vsub generator booster circuit 18 is made (on chip) on the same substrate 19 as the sensor row 2 and the charge transfer register 14 and uses two-phase clocks φH1 and φH2 as the clock pulses φ1 and φ2.

It is also possible to use the boosting circuit not just as the Vsub generator booster circuit 18 but also for providing the operating power supply voltages to other circuits such as the buffer 16.

Figure 6:
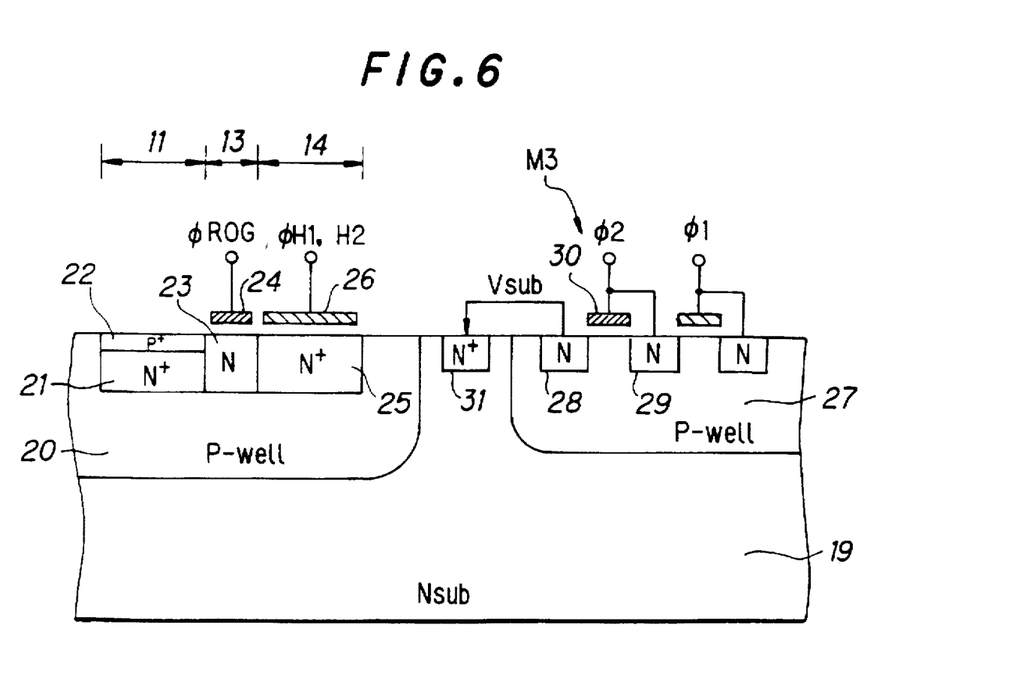
FIG. 6 is a cross-sectional structural view of the essential parts of the CCD linear sensor having boosting circuit which generates a substrate voltage.

FIG. 6 is a cross-sectional structural drawing showing the essential parts of the Vsub generator booster circuit 18 formed on-chip with the CCD linear sensor.

In FIG. 6, a light receiver 11 comprised of a P⁺ type hole accumulation layer 22 on an N⁺ type load accumulation layer 21 is formed within a P-well on an N-type silicon substrate 19. A read-out gate 13 comprised of an N-type impurity region 23 with a gate electrode 24 provided at it's upper end and a charge transfer register 14 comprised of an N⁺ type impurity region with a transfer electrode 24 provided at it's upper end are formed next to the light receiver 11.

A final stage MOS transistor (the MOS transistor M3 in FIG. 1) taking an N-type impurity region 28 as it's source region, an N-type impurity region 29 as it's drain region, with a gate electrode 30 being provided above and between regions 28 and 29, is formed within a separate P-well 27 which is formed separately from the P-well 20.

A boosting voltage is derived from the source region 28 of the final stage MOS transistor M3. This boosting voltage is then taken as the substrate voltage Vsub and applied to the N+ type non-volatile region 31 formed on the surface side of the N-type silicon substrate 19.

In the above way, by using the boosting circuit of the present invention as the Vsub generator booster circuit 18, the boosting circuit of the present invention can charge a large capacitance with a small MOS transistor and can therefore achieve this on-chip and the chip-size can also be made small.

This will contribute to the compactness of the CCD linear sensor and can also deal with lowering of power supply voltages.

Second Embodiment

Figure 7:
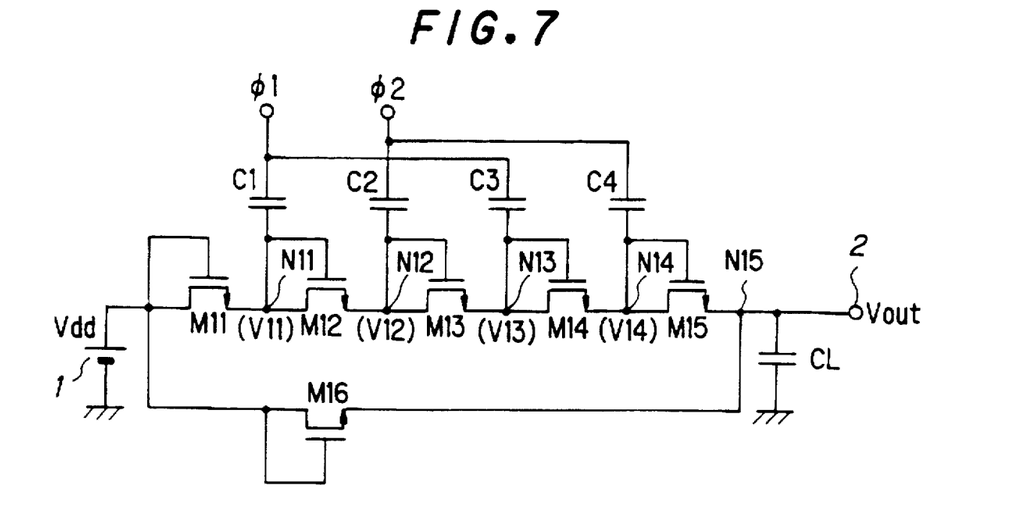
FIG. 7 is a circuit diagram showing a second embodiment of the present invention.

FIG. 7 is a circuit diagram showing a second embodiment of a boosting circuit according to the present invention. In this diagram, portions which are the same as portions in FIG. 1 will be given the same numerals. In this embodiment, a structure is adopted where the number of MOS boosting transistor stages is increased so that, for example, MOS transistors Mn are connected in 5 stages in series, with the intention of generating a higher boosting voltage Vout.

In FIG. 7, MOS boosting transistors M11 to M15 with their gates and drains connected in common are connected across the positive pole side of the power supply 1 and the output circuit terminal 2 so as to be in series in the forward direction from the power supply 1 side to the circuit output terminal 2 side as a one-way element.

A clock pulse φ1 is applied to each of the output ends N11 and N13 of the first and third stage (odd numbered stages with the final stage excluded) MOS transistors M11 and M13 via capacitors C1 and C3. On the other hand, a clock pulse φ2 of opposite phase to the clock pulse φ1 is applied via a capacitor C2 to each of the output ends N12 and N14 of the second and fourth stage (even numbered stages) MOS transistors M12 and M14.

A load capacitor CL is then connected across the output end N15 (circuit output terminal 2) of the fifth-stage MOS transistor M15 and earth.

Further, a MOS transistor M16 for charging which has it's gate and drain connected in common is connected across the positive pole side of the power supply 1 and the circuit output terminal 2 as a one way element and is connected in the forward direction going from the side of the power supply 1 to the side of the circuit output terminal 2, i.e. the gate and drain of the MOS transistor M16 for charging are wired to the positive electrode side of the power supply 1 and the source is wired to the circuit output terminal 2.

Next, the charging operation of the charging circuit of the second embodiment having the above construction is described.

First, the power supply goes on (power supply on), the MOS transistor M16 for charging conducts so as to become forward-biased and the charging of the load capacitor CL via the MOS transistor M16 for charging therefore commences. Further, by turning on the power supply 1, the MOS transistors M11 to M15 for boosting also become forward biased and conducts (goes on) so that the charging which accompanies the boosting operation of the transistors M11 to M15 for boosting can be carried out simultaneously.

Figure 8:
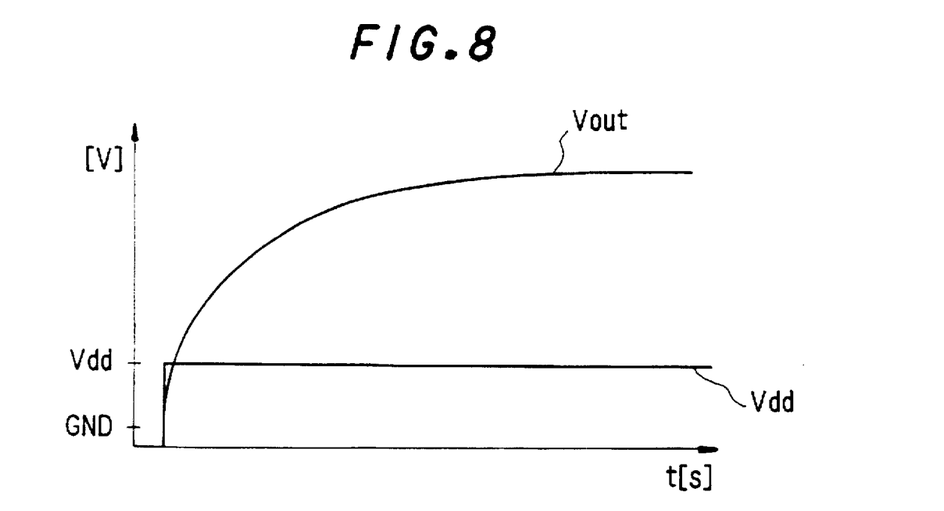
FIG. 8 is a wave diagram showing the response waveform when the power supply is turned on for the second embodiment.

In this way, the booster voltage Vout can be made to rise quickly, as shown by the solid line in FIG. 8, because the load capacitor CL can be rapidly charged via the MOS transistor M6 for charging at the time of turning on.

If the response waveform at the time of turning on the power supply in the first embodiment in FIG. 2 is compared with the response waveform at the time of turning on the power supply in the second embodiment in FIG. 8, the speed of the rising of the boosting voltage Vout can be seen to increase as the number of MOS transistors M1 to M5 for charging is made large.

The charging of the load capacitor continues, and when the charging voltage exceeds the power supply voltage Vdd, the MOS charging transistor M16 goes into reverse bias so as to become non-conducting (off).

After this, the boosting operation using the MOS boosting transistors M11 to M15 is carried out under fixed conditions. The boosting operation under these fixed conditions will be described with reference to the timing chart in FIG. 9.

Figure 9:
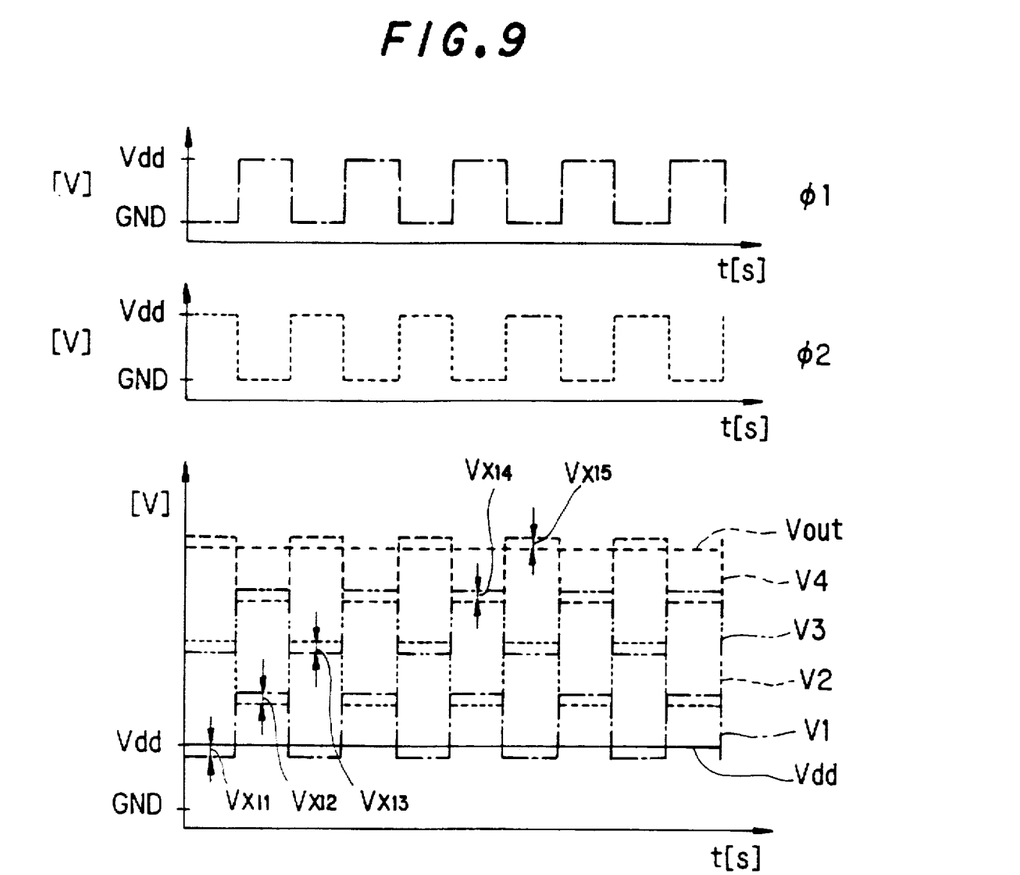
FIG. 9 is a timing diagram under fixed conditions for the second embodiment.

First, the voltage V11 at the output end N11 of the first stage MOS transistor M11 is lower than the power supply voltage Vdd by the voltage $Vx_{11}$, which is the voltage drop due to the threshold voltage $Vth_{11}$ of the MOS transistor M11.

Under these conditions, when the clock pulse $\phi1$ is inputted via the capacitor C1, the voltage V11 at the output end N11 of the MOS transistor M11 is boosted by a value equal to the wave height of the clock pulse $\phi1$.

Then, the voltage V12 at the output end N12 of the second stage MOS transistor M12 is lower than the voltage V11 at the output end N11 by the voltage $Vx_{12}$, which is the voltage drop due to the threshold voltage $Vth_{12}$ of the MOS transistor M12.

In these circumstances, when the clock pulse 42 is inputted via the capacitor C2, the voltage V12 at the output end N12 of the MOS transistor M12 is boosted by a value equal to the wave height of the clock pulse $\phi2$.

Next, the voltage V13 at the output end N13 of the third stage MOS transistor M13 is lower than the voltage V12 at the output end N12 by the voltage $Vx_{13}$, which is the voltage drop due to the threshold voltage $Vthl_3$ of the MOS transistor M13.

In this situation, when the clock pulse 41 is inputted via the capacitor C3, the voltage V13 at the output end N13 of the MOS transistor M13 is boosted by a value equal to the wave height of the clock pulse $\phi1$.

After this, the voltage V14 at the output end N14 of the fourth stage MOS transistor M14 is lower than the voltage V13 at the output end N13 by the voltage $Vx_{14}$, which is the voltage drop due to the threshold voltage $Vth_{14}$ of the MOS transistor M14.

Under these circumstances, when the clock pulse $\Phi2$ is inputted via the capacitor C4, the voltage V14 at the output end N14 of the MOS transistor M14 is boosted by a value equal to the wave height of the clock pulse $\phi2$.

The voltage V14 at the output end N14 is smoothed by the MOS transistor M15 and the load capacitor CL and derived from the circuit output terminal 2 as the boosting voltage Vout. The boosting voltage Vout is lower than the voltage V14 of the output end N14 by an amount Vx15. Here, $Vx_{15}$ is the lowering of the voltage due to the threshold voltage $Vth_{15}$ of the MOS transistor M15.

A higher-voltage boosting voltage Vout can be derived by increasing the number of stages of MOS transistors for boosting.

Therefore, according to the boosting circuit of the second embodiment, in the case of use in the Vsub generation boosting circuit of the solid-state image-sensing device shown in FIG. 5, the necessary substrate voltage Vsub of about 5V for realizing the performance of the solid-state image-sensing device can be easily obtained even if the power supply voltage for the solid-state image sensing device is reduced by about, for example, 1.5V.

It is also possible to use a diode D1 as the one-way element in place of the diode connection MOS transistor M6 in the example modification of the first embodiment shown in FIG. 4.

Also, the number of stages of MOS transistors for boosting is by no means limited to the three stages and five stages shown in the first and second embodiments. Two stages, four stages or six stages or more are also possible, whereby the larger the number of MOS transistor stages for boosting, the higher the boosting voltage which can be extracted.

As described above, according to the present invention, by adopting a construction where a one-way element is connected across a power supply and a circuit output terminal in the forward direction going from the power supply side to the circuit output element side in a pulse-boosting type boosting circuit, the rising characteristic of the boosting voltage can be improved without it being necessary to adapt the size of the circuit elements because the load can be rapidly charged via the one-way elements at the time of turning on the power supply.

Further, with the boosting circuit according to the present invention, an on-chip construction can be adopted and the chip-size can be made small in applications in solid-state image-sensing devices because a large capacitance can be charged using compact circuit elements.

This therefore contributes to the compactness of the solid-state image-sensing device and is compatible with the lowering of the power supply voltage.

What is claimed is:

1. A boosting circuit comprising:
    a power supply terminal connected to only one power supply source for receiving a supply voltage;
    an output terminal;
    clock terminals for receiving clock pulses;
    a one-way boosting element comprising a plurality of stages connected in series across the power supply terminal and the output terminal in a forward direction going from the power supply terminal to the output terminal to generate a boosting voltage having a rise time, each one-way boosting element stage being formed as a MOS transistor having a threshold voltage, a gate, a source and a drain connected to the gate; wherein respective ones of said clock terminals are connected between successive one-way boosting element stages to provide respective clock pulses; and wherein the supply voltage is reduced by the threshold voltage of each stage of said one-way boosting element; and a one-way element for charging connected in parallel with the one-way boosting element in the forward direction, whereby the one-way boosting element operates simultaneously with the one-way element for charging to shorten the rise time of said boosting voltage.

2. A boosting circuit according to claim 1, wherein the one-way element for charging is a MOS transistor having a gate, a source, and a drain connected to the gate.

3. A boosting circuit according to claim 1, wherein the one-way element for charging is a diode.

4. A boosting circuit according to claim 1, further including a load capacitor connected across the output terminal and earth.

5. A boosting circuit according to claim 1, wherein the clock pulses are first and second clock pulses of opposite phases.

6. A solid-state image-sensing device comprising:

a sensor having a plurality of arrayed light receivers for converting incident light into charges corresponding to the amount of incident light and accumulating the charges;

a charge transfer register for transferring charges read-out from each of the light receivers;

a charge detector for detecting and converting to electrical signals charges transferred by the charge transfer register;

a power supply terminal connected to only one power supply source for receiving a supply voltage;

an output terminal;

clock terminals for receiving clock pulses;

a one-way boosting element comprising a plurality of stages connected in series across the power supply terminal and the output terminal in a forward direction going from the power supply terminal to the output terminal to generate a boosting voltage having a rise time, each one-way boosting element stave being formed as a MOS transistor having a threshold voltage, a gate, a source and a drain connected to the gate; wherein respective ones of said clock terminals are connected between successive one-way boosting element stages to provide respective clock pulses; and wherein the supply voltage is reduced by the threshold voltage of each stage of said one-way boosting element; and a one-way element for charging connected in parallel with the one-way boosting element in the forward direction, whereby the one-way boosting element operates simultaneously with the one-way element for charging to shorten the rise time of said boosting voltage.

7. A solid-state image sensing device according to claim 6, wherein the boosting circuit boosts a power supply voltage and generates a substrate voltage.

8. A solid-state image-sensing device according to claim 6, wherein the sensor, the charge transfer register, the charge detector and the boosting circuit are formed on the same substrate.

9. A solid-state image-sensing device according to claim 6, wherein the one-way element for charging is a MOS transistor having a gate, a source and a drain connected to the gate.

10. A solid-state image-sensing device according to claim 6, wherein the one-way element for charging is a diode.

11. A solid-state image-sensing device according to claim 6, further including a load capacitor connected across the output terminal and earth.

12. A solid-state image sensing device according to claim 6, wherein each of the one-way boosting element stages includes an input terminal and an output terminal, and said device further includes capacitors connected to the means for generating clock pulses and the output terminal of respective one-way boosting element stages.

13. A solid-state image-sensing device according to claim 6, wherein the clock pulses are first and second clock pulses of opposite phases.

14. A solid-state image-sensing device according to claim 6, wherein the clock pulse is a transfer clock for driving the charge transfer register.

15. A solid-state image-sensing device having a boosting circuit in one chip, comprising:

a sensor having a plurality of arrayed light receivers for converting incident light into charges corresponding to the amount of incident light and accumulating the charges;

a charge transfer register for transferring charges read-out from each of the light receivers;

a charge detector for detecting and converting to electrical signals charges transferred by the charge transfer register;

the boosting circuit comprising:

a power supply terminal connected to only one power supply source for receiving a supply voltage;

an output terminal connected to a substrate;

clock terminals for receiving clock pulses, said clock terminals connected to the charge transfer register such that said clock pulses drive the charge transfer register and the boosting circuit;

a one-way boosting element comprising a plurality of stages connected in series across the power supply terminal and the output terminal in a forward direction going from the power supply terminal to the output terminal to generate a boosting voltage having a rise time which is used as a substrate voltage, each one-way boosting element stage being formed as a MOS transistor having a threshold voltage, a gate, a source and a drain connected to the gate; wherein respective ones of said clock terminals are connected between successive one-way boosting element stages to provide respective clock pulses; and wherein the supply voltage is reduced by the threshold voltage of each stage of said one-way boosting element; and a one-way element for charging connected in parallel with the one-way boosting element in the forward direction, whereby the one-way boosting element operates simultaneously with the one-way element for charging to shorten the rise time of said boosting voltage.

16. A solid-state image-sensing device according to claim 15, wherein the sensor, the charge transfer register, the charge detector and the boosting circuit are formed on the same substrate.

17. A solid-state image-sensing device according to claim 15, wherein the one-way element for charging is a MOS transistor having a gate, a source, and a drain connected to the gate.

18. A solid-state image-sensing device according to claim 15, further including a load capacitor connected to the output terminal.

19. A solid-state image sensing device according to claim 15, wherein each of the one-way boosting element stages includes an input terminal and an output terminal; and said device further includes capacitors connected to the means for generating clock pulses and the output terminal of respective one-way boosting element stages.

20. A solid-state image sensing device according to claim 15, wherein the clock pulses are first and second clock pulses of opposite phases.

* * * * *